July 2, 1946.  T. R. SMITH  2,403,028
VALVE SEAT SEAL FOR FAUCETS
Filed June 14, 1943
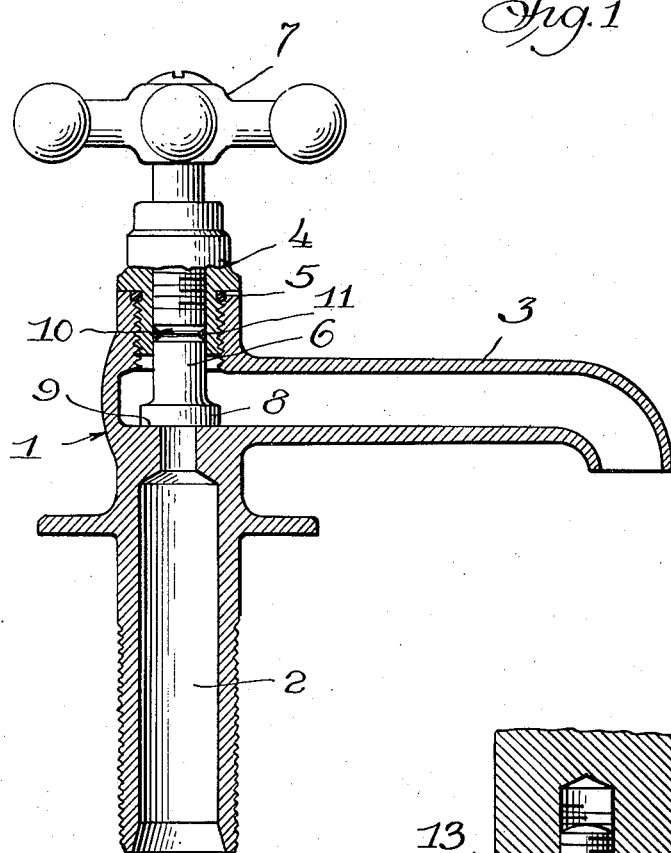
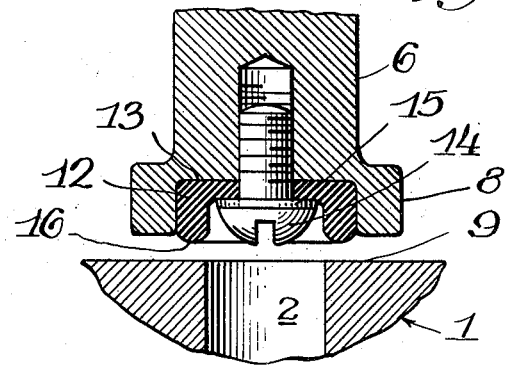
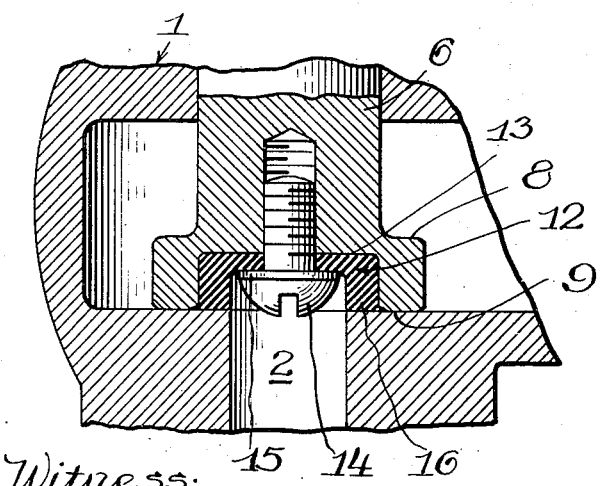
Witness:
Chas. R. Koursh
INVENTOR.
Thomas R. Smith
BY Parkinson & Lane
Attys.

Patented July 2, 1946

2,403,028

UNITED STATES PATENT OFFICE 2,403,028

VALVE SEAT SEAL FOR FAUCETS

Thomas R. Smith, Newton, Iowa, assignor to The Maytag Company, Newton, Iowa, a corporation of Delaware Application June 14, 1943, Serial No. 490,713

1 Claim. (Cl. 251—160)

The present invention relates to a faucet construction and especially to a novel valve seat seal for preventing leakage of fluid when the valve is moved to closed position. Unlike prior constructions of faucets wherein it is possible to place an undue amount of pressure on the sealing element causing the valve seat to be easily and quickly damaged and its life and service shortened appreciably by excessive pressure on the valve stem, it is impossible in the present construction to damage the valve seat seal as it is protected against excessive pressure by contact between the valve stem and the valve seat surface in the faucet body.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in vertical cross section through a water faucet equipped with the novel valve seat seal.

Figure 2 is a fragmentary enlarged view in vertical cross section through the valve stem and valve seat seal when the latter is in sealing position.

Figure 3 is a view similar to Figure 2 but with the valve seat seal raised to permit flow through the faucet.

In the illustrative embodiment in the drawing, the novel invention is shown as applied to the valve structure of a water faucet, although the present invention is not limited thereto but is applicable to various types of valves. The disclosed faucet comprises a faucet body 1 having an intake 2 and spout or nozzle 3 for discharge of water or other fluid. Threaded into the upper end of the faucet body is a packing nut 4 sealed against leakage by a gasket seal or washer 5. A valve stem 6 is threaded into the packing nut and provided with a handle 7 which, when turned, will move the valve stem longitudinally and thereby move the lower end or base 8 of the valve into or out of engagement with the valve seat surface 9 of the faucet body.

In order to prevent leakage and most effectively seal along the valve stem, this stem is preferably provided with a substantially V-shaped recess 10 carrying a substantially wedge-shaped resilient sealing ring or packing 11. This ring has its opposite side walls disposed at an angle of approximately 45°, and its vertex and base or sealing surface rounded. The opposite side walls of recess 10 are disposed at an angle of approximately 60° so that when the sealing ring or packing is not under compression, its side walls are spaced from the sides of the recess. The base of the recess is curved upon a radius preferably greater than but approximately conforming to the radius of the vertex of the sealing ring or packing to permit the ring to pivot within the recess and afford continuous and optimum sealing under all operating conditions.

A valve seat seal 12 is adapted to be conformably received in a depression 13 formed in the lower end or base 8 of the valve stem and retained therein by a screw 14 and washer 15. This seal is provided with a depending annular flange 16 adapted to extend a short distance below the base or lower end 8 of the valve stem in order to contact and seal against the valve seat surface 9 when the handle 7 is turned to lower the valve stem 6. Further turning or tightening of the handle compresses the seal 12 up to the point where the base of the valve stem seats against the surface 9 of the faucet body. By making this seal of resilient material, the outer periphery of its lower edge is forced by means of the pressure of the fluid being sealed into the corner formed by the rounded lower end of the valve stem and the valve seating surface of the faucet body, thereby positively sealing against any leakage around the base of the valve stem. Thus it will be seen that this novel valve seat seal 12 is practically self-sealing and is not dependent on the amount of pressure applied to the handle 7 beyond the point that the base 8 of the valve stem comes into contact with the surface 9 of the faucet body.

From the above description and the disclosure in the drawing, it will be apparent that the present valve seat seal will effectively prevent leakage regardless of the accuracy of the finish between the base of the valve stem and the surface against which the valve seats. Furthermore, there is no danger of the seal being damaged or failing to seal regardless of how tight the handle and valve stem are turned, as it is protected against excessive pressure by the solid, metal-to-metal contact between the valve stem and the seating surface of the faucet body and in order to seal it is only necessary that the seal be moved into contact with this seating surface.

In addition to the above advantages, the entire valve stem assembly may be assembled, removed and replaced as a unit, and the valve seat seal may be quickly replaced. This seal 12, as well as the gasket 5 and sealing ring 11, may be of any resilient material suitable for the purpose, such as natural or compounded synthetic rubber or rubber-like material.

Having thus disclosed the invention, I claim:

In a faucet construction having an inlet and a flat valve seating surface in the body of the faucet surrounding the inlet, a valve stem in the body of the faucet provided with a recess and an annular depending seating flange on the end of the stem, a resilient sealing element carried within the recess and annular flange and provided with a disc-like portion and an annular depending sealing lip at its periphery and having a rounded face extending below the end of the flange, the flange and sealing lip being so arranged that as the stem is lowered against the seating surface, the lip first comes into contact with the seating surface and as the stem is further lowered, compression is placed on the lip until the flange engages the seating surface when the lip is forced by the pressure of the fluid being sealed into the corner formed between the flange and the seating surface, thereby positively sealing off any leakage around the stem.

THOMAS R. SMITH.